(12) United States Patent
Shukla et al.

(10) Patent No.: US 12,276,533 B2
(45) Date of Patent: Apr. 15, 2025

(54) MATERIALS AND DIAGNOSTICS FOR HYDROGEN SERVICE ENVIRONMENTS

(71) Applicant: Halliburton Energy Services, Inc., Houston, TX (US)

(72) Inventors: Shashwat Shukla, Singapore (SG); Arpana Singh, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 562 days.

(21) Appl. No.: 17/685,207

(22) Filed: Mar. 2, 2022

(65) Prior Publication Data
US 2023/0280191 A1    Sep. 7, 2023

(51) Int. Cl.
| | |
|---|---|
| G01D 5/26 | (2006.01) |
| G01N 17/00 | (2006.01) |
| G01N 17/04 | (2006.01) |
| G01D 5/353 | (2006.01) |

(52) U.S. Cl.
CPC ........... G01D 5/268 (2013.01); G01N 17/006 (2013.01); G01N 17/04 (2013.01); *G01D 5/35316* (2013.01)

(58) Field of Classification Search
CPC ... G01D 5/35316; G01D 5/268; G01N 17/006
See application file for complete search history.

(56) References Cited

U.S. PATENT DOCUMENTS

| | | | |
|---|---|---|---|
| 2011/0228275 A1 | 9/2011 | Xia et al. | |
| 2012/0085145 A1* | 4/2012 | Xiao | B82Y 30/00 |
| | | | 428/401 |
| 2012/0103066 A1* | 5/2012 | Xia | G01N 21/774 |
| | | | 73/25.05 |

(Continued)

FOREIGN PATENT DOCUMENTS

| | | |
|---|---|---|
| JP | 2016223804 | 12/2016 |
| KR | 100923104 | 10/2009 |

OTHER PUBLICATIONS

Havermann, Dirk; Mathew, Jinesh; MacPherson, William N.; Maier, Robert R. J.; Hand, Duncan P. (2015). Temperature and Strain Measurements With Fiber Bragg Gratings Embedded in Stainless Steel 316. Journal of Lightwave Technology, 33(12), 2474-2479.

(Continued)

*Primary Examiner* — Sung H Pak
*Assistant Examiner* — Hoang Q Tran
(74) *Attorney, Agent, or Firm* — Scott Richardson; C. Tumey Law Group PLLC

(57) ABSTRACT

HIC-resistant materials may include sensors embedded within or otherwise coupled thereto for use in a hydrogen service environment. In an example, a diagnostic system includes a first sensor embedded within a structural metal for exposure to hydrogen for generating a signal response to both the hydrogen and one or more parameter. A second sensor is embedded within the structural metal for generating another signal response to the one or more parameter. A hydrogen-suppressing layer is provided to suppress any response of the second sensor to the hydrogen. A controller in communication with the first and second sensors distinguishes the signal response of the first sensor from the signal response of the second sensor to characterize the hydrogen and the one or more other parameter.

20 Claims, 6 Drawing Sheets

(56) References Cited

U.S. PATENT DOCUMENTS

2014/0374578 A1    12/2014  Bertrand et al.
2020/0326278 A1*   10/2020  Guo .................. G02B 6/02085

OTHER PUBLICATIONS

Chang, Ye; Zuo, Jingjing; Zhang, Hainan; Duan, Xuexin (2019). State-of-the-art and recent developments in micro/nanoscale pressure sensors for smart wearable devices and health monitoring systems. Nanotechnology and Precision Engineering, (), S2589554019300522.

Li, Zhong; Yao, ZhengJun; Haidry, Azhar Ali; Plecenik, Tomas; Xie, LiJuan; Sun, LinChao; Fatima, Qawareer (2018). Resistive-type hydrogen gas sensor based on TiO2: A review. International Journal of Hydrogen Energy, (), S0360319918328970.

Ndaya, Cynthia Cibaka; Javahiraly, Nicolas; Brioude, Arnaud (2019). Recent Advances in Palladium Nanoparticles-Based Hydrogen Sensors for Leak Detection. Sensors, 19(20), 4478.

Guo, Yongxing; Kong, Jianyi; Liu, Honghai; Hu, Dongtao; Qin, Li (2016). Design and Investigation of a Reusable Surface-mounted Optical Fiber Bragg Grating Strain Sensor. IEEE Sensors Journal, (), 1-1.

S&T Organization, Grandal, et al., Fibre Optic Sensor Embedded into Metals Using Low Cost TIG Welding and High Precision Laser Brazing, 2017.

Grandal, et al., AIMEN technology center, Laser Brazing metallic embedding technique for fiber optic sensors, 2017.

Wang, et al., Optical Fiber and Planar Waveguide Technology, Simultaneous measurement of strain and temperature using dual-period fiber grating, 2001.

Bhatia, Dissertation, Properties and sensing applications of long-period gratings, 1996.

Optical Society of America, Bhatia, Applications of long-period gratings to single and multi-parameter sensing, 1999.

James, et al., Simultaneous independent temperature and strain measurement using in-fibre Bragg grating sensors, 1996.

GrÄ¶ner, Lukas; Mengis, Lukas; Galetz, Mathias; Kirste, Lutz; Daum, Philipp; Wirth, Marco; Meyer, Frank; Fromm, Alexander; Blug, Bernhard; Burmeister, Frank (2020). Investigations of the Deuterium Permeability of As-Deposited and Oxidized Ti2AlN Coatings. Materials, 13(9), 2085.

Xu, et al., Discrimination between strain and temperature effects using dual-wavelength fibre grating sensors, 1994.

Kinet, Damien; Mégret, Patrice; Goossen, Keith; Qiu, Liang; Heider, Dirk; Caucheteur, Christophe (2014). Fiber Bragg Grating Sensors toward Structural Health Monitoring in Composite Materials: Challenges and Solutions. Sensors, 14(4), 7394-7419.

Yu, Jiachen; Wu, Zhenlin; Yang, Xin; Han, Xiuyou; Zhao, Mingshan (2018). Tilted Fiber Bragg Grating Sensor Using Chemical Plating of a Palladium Membrane for the Detection of Hydrogen Leakage. Sensors, 18(12), 4478.

Grandal Gonzalez, T.; Zornoza, A.; Fraga, S.; Castro, G.; Sun, T.; Grattan, K. T. V. (2017). Laser Cladding-based metallic embedding technique for fiber optic sensors. Journal of Lightwave Technology, (), 1-1.

Hehr, Adam; Norfolk, Mark; Wenning, Justin; Sheridan, John; Leser, Paul; Leser, Patrick; Newman, John A. (2017). Integrating Fiber Optic Strain Sensors into Metal Using Ultrasonic Additive Manufacturing. JOM, ().

International Search Report and Written Opinion for PCT/US2022/019552 dated Nov. 22, 2022.

\* cited by examiner

MATERIALS AND DIAGNOSTICS FOR HYDROGEN SERVICE ENVIRONMENTS

BACKGROUND

Hydrogen induced cracking (HIC) can cause unexpected fracture of metallic components used in service environments where the components are exposed to hydrogen gases and compounds, such as in the oil and gas industry. A vast majority of metals used in such environments are susceptible to HIC. Some alloys that have been developed to resist HIC lack sufficient structural strength or are cost prohibitive for some applications. The study of HIC and the development of materials for use in hydrogen service environments is ongoing.

BRIEF DESCRIPTION OF THE DRAWINGS

These drawings illustrate certain aspects of some of the embodiments of the present disclosure and should not be used to limit or define the method.

DETAILED DESCRIPTION

Figure 1:
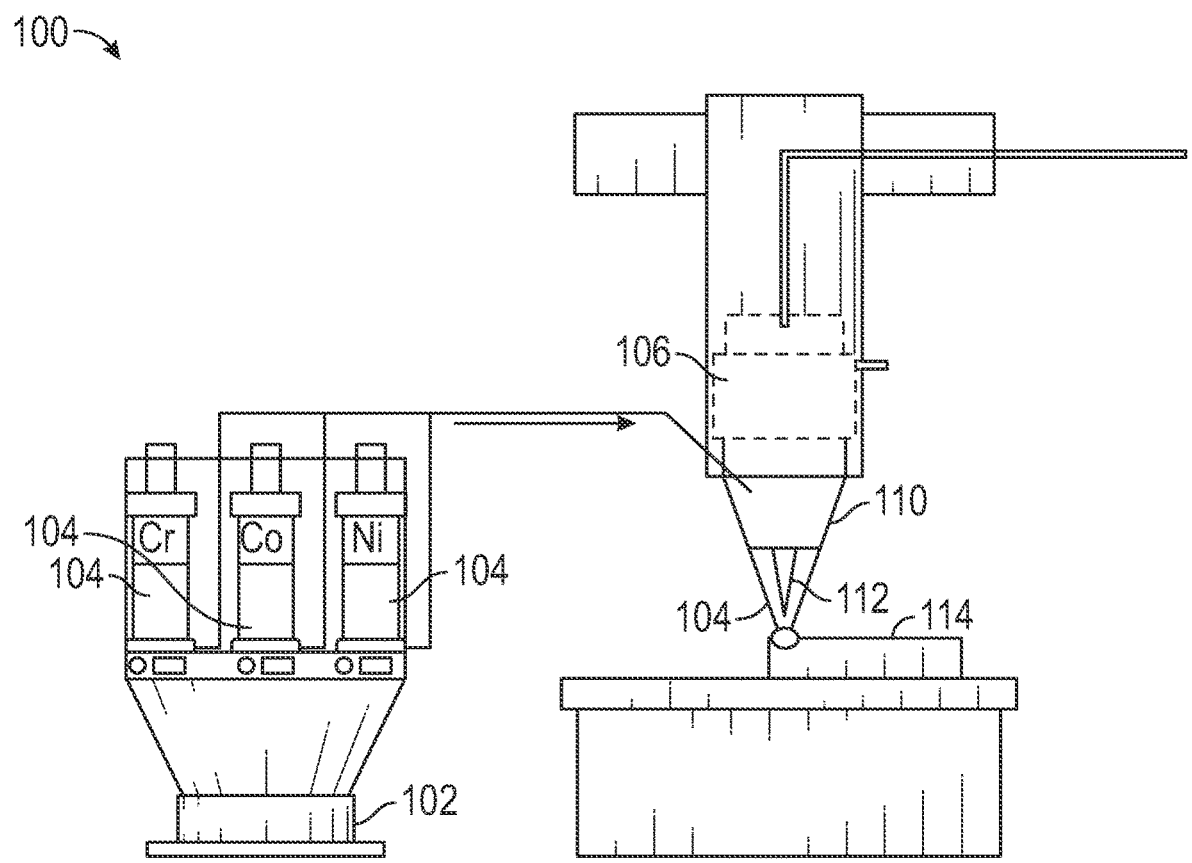
FIG. 1 is a schematic diagram of an energy deposition system that may be used to produce a layered metal structure as described herein.

The present disclosure includes diagnostic systems, methods, and materials for use in hydrogen service environments. A hydrogen service environment as used herein is a service environment with sufficient hydrogen to cause hydrogen-induced cracking. A hydrogen service environment may be an industrial service environment, such as a hydrocarbon recovery well or hydrocarbon refinery, pipelines for hydrogen transportation, or other industrial environments prone to HIC. A hydrogen service environment may also include a laboratory setting for evaluating hydrogen and its effects on materials and components. The hydrogen source in a hydrogen service environment may comprise any form of hydrogen compound in any phase that could lead to HIC, including but not limited to a hydrogen-based gas such as $H_2$ or $H_2S$, or hydrogen-containing compounds that may be volatilized.

The present disclosure further includes materials engineered to monitor and mitigate HIC, structural components made of such engineered materials, and systems and methods for manufacturing such materials and/or components. The components may include HIC-resistant materials with sensors embedded in or otherwise coupled thereto. The sensors may be used to monitor and characterize the hydrogen, such as to identify its presence, effect, or concentration, and optionally other parameters, within the hydrogen service environment. In some systems a controller may be electronically coupled to the sensors for automatically sensing and processing signal from the sensors.

The disclosed diagnostic systems and methods are useful in laboratory or commercial settings. In a laboratory setting, the systems and methods may be used to study and continually improve the HIC-resistant materials and their manufacture. In a service setting, the systems and methods may also be used to study and improve the materials, as well as to optionally monitor and generate signals related to hydrogen. Such signals may be used, for example, to detect and alert the operator of the presence of hydrogen, to provide predictive capabilities regarding the equipment in the hydrogen service environment, and/or to collect hydrogen data over the service life of the equipment and correlate the hydrogen data with observed degradation of the materials or components over time.

In one or more embodiments, a diagnostic system includes at least one sensor responsive to hydrogen from the hydrogen service environment and at least one sensor responsive to one or more parameter of the hydrogen service environment, such as temperature and strain. The signal responses from the sensors are distinguishable and may be compared in order to differentiate the effects of hydrogen from the effects of the one or more other parameter, and/or to distinguish between the effects of each parameter.

One preferred sensor type is a fiber Bragg grating (FBG), which has an optical response (e.g., wavelength shift) to the hydrogen and/or other parameters of the hydrogen service environment. Generally, FBGs may be made by laterally exposing the core of a single-mode fiber to a periodic pattern of intense laser light. The exposure produces a permanent increase in the refractive index of the fiber's core, creating a fixed index modulation according to the exposure pattern. This fixed index modulation is called a grating. At each periodic refraction change a small amount of light is reflected. All the reflected light signals combine coherently to one large reflection at a particular wavelength when the grating period is approximately half the input light's wavelength. This is referred to as the Bragg condition, and the wavelength at which this reflection occurs is called the Bragg wavelength. Light signals at wavelengths other than the Bragg wavelength, which are not phase matched, are essentially transparent.

In one example, first and second sensors may embedded in the skin of a layered metal structure. Each sensor may be responsive to hydrogen, temperature, and strain. The first sensor may generate a signal responsive to all three parameters (hydrogen, temperature, and strain) while the second sensor may be shielded with a hydrogen-suppressing layer on the sensor or in the HIC-resistant material over or around the sensor to suppress any signal response of the second sensor to the hydrogen. Thus, the signal responses from the two sensors may be compared to identify the contribution of the hydrogen to the signal response of the first sensor, and to thereby characterize the hydrogen such as its concentration. Further, each sensor may include two sensor portions that each generate a signal response but with different sensitivities to the temperature and strain. For example, each FBG may include superimposed gratings having a different wavelength shift to the same parameters (e.g., to the same temperature and/or to the same strain). The different wavelength shift of the gratings on the sensor may be compared to differentiate the contribution of each parameter. Thus, the signal responses of the sensors and the individual sensor portions may be analyzed to characterize the individual contributions of the temperature, the strain, and the hydrogen.

An HIC-resistant structural material may include any of a variety of materials. In some examples, the material comprises a layered metal alloy formed by laser deposition or other additive manufacturing techniques. The outer layer may be configured to resist hydrogen-induced crack initiation, and one or more inner layers may be configured to resist growth of any hydrogen-induced cracks. In one embodiment, a skin exposed to the hydrogen may have a microstructure with sufficiently high stacking fault energy (which may be associated with high entropy in certain contexts) to suppress initiation of HIC. The skin may be layered over a core having a microstructure with sufficiently low stacking fault energy to suppress crack growth. The core may have a composition amenable to the creation of twins in the microstructure, which may be achieved through work hardening, whereas the skin may be resistant to the formation of twins.

In some embodiments, the HIC-resistant materials may be functionally graded materials (FGMs), wherein the microstructure varies with position to achieve alternative material characteristics in a single component. FGMs may be formed with discrete layers of varying composition, or a continuous variation of composition. FGMs may also be a combination of layered and continuous variation where there is a continuous variation at the two or more discrete layers.

The microstructures may be varied as described herein to affect how hydrogen propagates or interacts at a molecular or atomic level. When atoms are arranged in a crystal, the packing is generally not uniform or perfect, leading to gaps or open spaces termed as interstitial sites. In conventional metals, hydrogen makes use of these interstitial sites to hop from one site to another site within the metal. Compared to conventional metals, which may only have one or two major elements, high-entropy alloys (those having or capable of a high stacking fault energy) may contain large amounts of elements (for example, at least five). The presence of different types of atoms that differ in size and electronic structure may distort the lattice and create new packing sequences. This, in turn, may lead to the formation of new interstitial sites that, instead of promoting diffusion, traps hydrogen atoms and retard any long-distance migration of hydrogen. By adding suitable elements to increase lattice distortion, the capability of the high entropy alloys to suppress hydrogen ingress may be significantly enhanced.

The present systems and methods may produce a layered or graded microstructure that may inhibit the diffusion of hydrogen into the metal alloy and suppresses the initiation and growth of any potential hydrogen induced cracks. The characteristics required to resist HIC may not be the same for surfaces, sub-surface regions, and the bulk. The present systems and methods may allow for the creation of the required microstructural variability without introducing undesirable side effects during alloy processing.

FIG. 1 is a schematic diagram of an energy deposition system 100 that may be used to produce a layered metal structure as described herein. The energy deposition system 100 is just an example for discussion purposes, as a variety of equipment and methods within the scope of this disclosure could be used to manufacture a layered structure having the attributes described herein. The energy deposition system 100 in this example may comprise a powder feeder 102, a laser head 106, and a nozzle 110. The powder feeder 102 may comprise any suitable size, height, shape, and any combinations thereof. Further, the powder feeder 102 may comprise any suitable materials, such as metals, nonmetals, polymers, composites, and any combinations thereof. The powder feeder 102 may be configured to house or contain one or more powders 104 and may provide the one or more powders 104 to the laser head 106. Any suitable type of material in a powder-form may be utilized as the one or more powders 104. Without limitations, the one or more powders 104 may comprise chromium, nickel, cobalt, derivatives thereof, and any combination thereof. The powder feeder 102 may output the one or more powders 104 as well as a suitable gas to the laser head 106. Without limitations, the suitable gas may be argon.

The laser head 106 may comprise any suitable size, height, shape, and any combinations thereof. Further, the laser head 106 may comprise any suitable materials, such as metals, nonmetals, polymers, composites, and any combinations thereof. The laser head 106 may be configured to receive the one or more powders 104 and a suitable gas to produce a metal alloy 114. The laser head 106 may be configured to produce a metal alloy by producing a laser 112 to interact with the one or more powders 104. In embodiments, the laser 112 may be produced from the received suitable gas. The laser head 106 may displace the received one or more powders 104 into the nozzle 110, wherein the nozzle 110 is configured to direct the laser 112 and the one or more powders 104 out towards an external surface. As the energy deposition system 100 operates, the metal alloy 114 may be produced layer-by-layer. The metal alloy 114 may be formed in layers, which may include a skin and a core as different layers.

Figure 2:
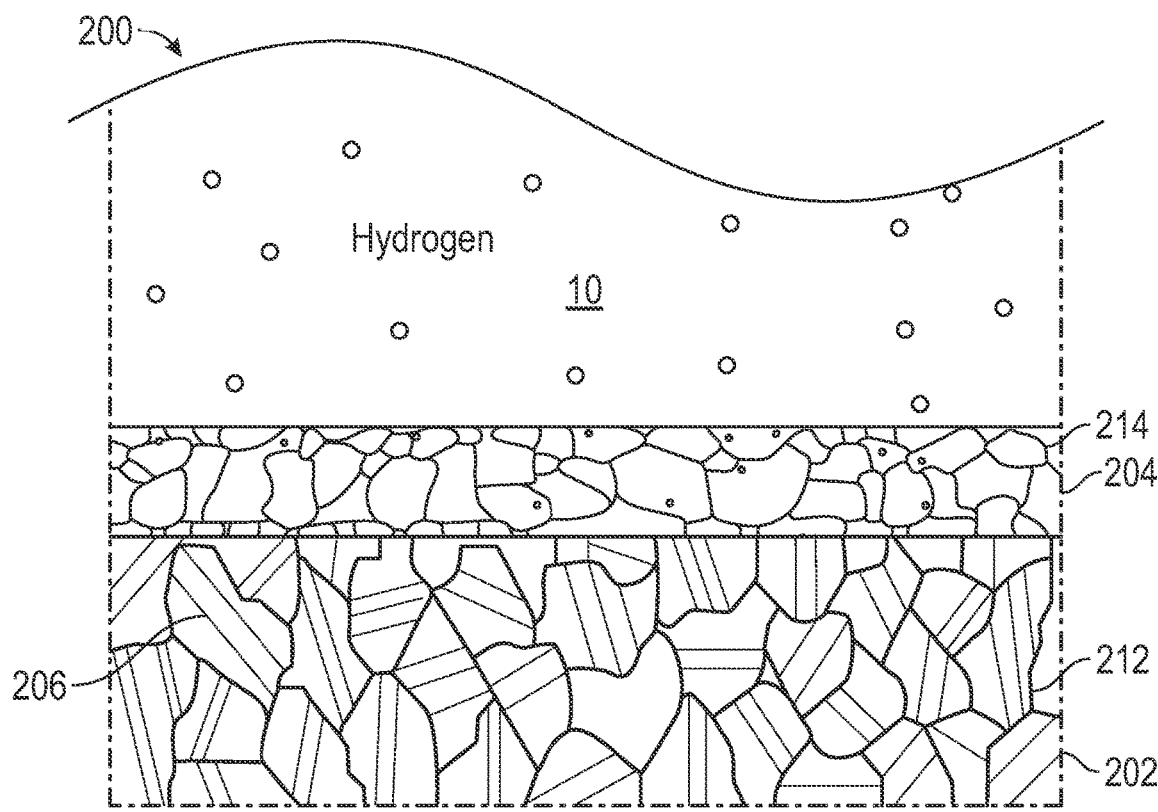
FIG. 2 is a sectional view of an example of an HIC-resistant layered metal in the presence of hydrogen.

FIG. 2 is a sectional view of an example of an HIC-resistant layered metal 200 in the presence of hydrogen 10. The layered metal 200 may represent the structural wall (not to scale) of a component, such as a valve, tubing, or pressure vessel of material handling or flow control equipment used to control flow of or contain the hydrogen or a hydrocarbon fluid comprising the hydrogen 10. The hydrogen 10 may come from a gas, a volatile compound, or other potential source of elemental hydrogen from a hydrogen service environment.

The layered metal 200 may be a nonhomogeneous, orthotropic metal comprising two or more layers of different entropies. In this example, the layered metal 200 comprises an outer layer referred to as a skin 204 and an inner layer referred to as a core 202. The skin 204 may be in direct contact with the hydrogen 10. For example, the layered metal 200 may be the wall of a pressure vessel, valve, or tubing that contains or conveys the hydrogen 10 and the skin 204 may define an interior wall in contact with the hydrogen 10. The core 202 is not in direct contact with the hydrogen 10, although atomic hydrogen may be capable of migrating from the hydrogen source through the skin 204 to the core 202, subject to the ability of the skin 204 to limit migration of hydrogen 10.

The properties of the layers 202, 204 may be individually selected and/or formed to achieve their desired properties. By way of example, a microstructure of the core 202 in FIG. 2 comprises grains 212 that are larger than the grains 214 of the skin 204. The properties of each layer 202, 204 may be determined, at least in part, by the layer's constituent materials, the layer's microstructure, and/or the layer's entropy. The constituents, microstructure, and entropy may themselves be interrelated. For example, the entropy may be determined, in part, by the constituent materials and the microstructure. The microstructure may be determined, in part, by the constituent materials and material processing steps, such as work hardening and/or heat treatment. For example, work hardening and/or heat treatment steps may affect the size of the grains and the interface between grains of a given microstructure.

The entropy of a given layer may determine its stacking fault energy. Generally, the skin 204 may be formed with an entropy greater than that of the core 202. More specifically, in some embodiments, the skin 204 may be formed as a high-entropy alloy and the core 202 may be formed as a low-entropy alloy. A low entropy alloy according to this disclosure may comprise a stacking fault energy of less than or equal to 25 mJ·m-2 and an entropy of less than or equal to 8.4 J/mol*K. A high entropy alloy may comprise a stacking fault energy greater than 25 mJ·m-2, and preferably greater than 50 mJ·m-2, and an entropy of about 11.5 J/mol*K or higher.

With a low stacking fault energy, the microstructure of an alloy may generate a greater density of twin boundaries. In this example, the core 202 has a relatively large occurrence of twin boundaries 206, which may result from the alloy of the core 202 being subjected to plastic deformation such as by rolling or other work hardening steps. In contrast, a microstructure with high stacking fault energy such as the skin 204 may not generate twin boundaries 206 during plastic deformation. Twin boundaries may occur when two crystals of the same type intergrow so that only a slight misorientation exists between them. The twin boundary may be considered as a coherent twin boundary, a mirror twin boundary, a twist twin boundary, a tilt twin boundary. The twin boundary may be characterized as a low angle grain boundary where the misorientation is less than about 20 degrees or a lower angle grain boundary where the misorientation is less than about 10 degrees. As illustrated, the core 202 may comprise twin boundaries 206 after being subjected to plastic deformation.

Figure 3:
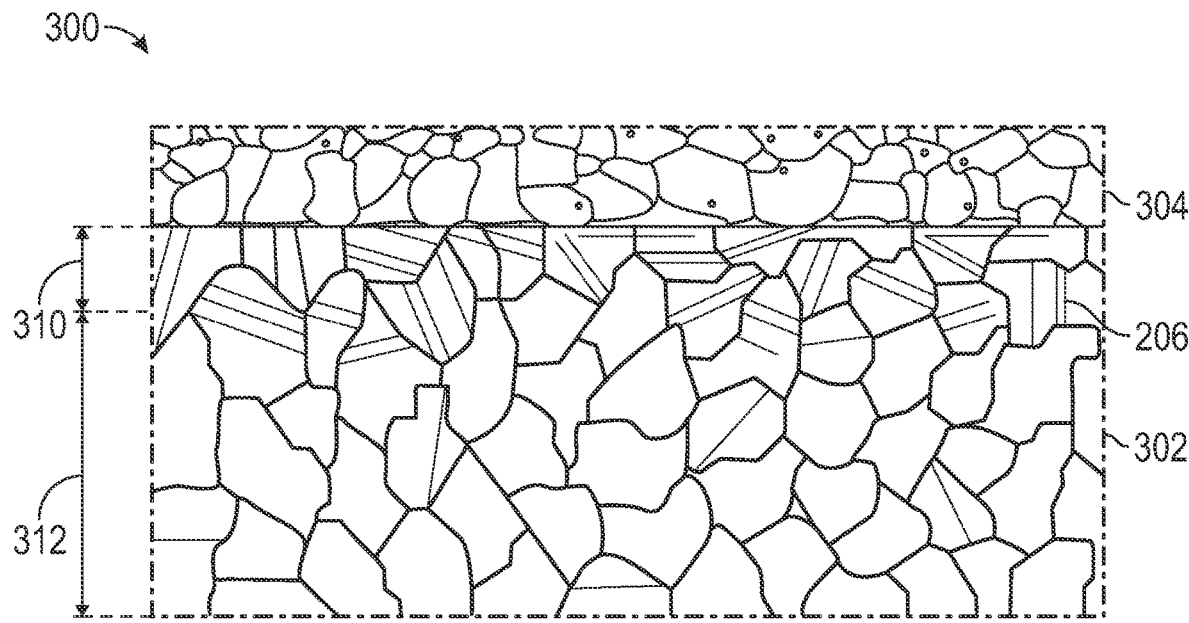
FIG. 3 is a sectional view of an alternate example of an HIC-resistant layered metal.

FIG. 3 is a sectional view of an alternate example of an HIC-resistant layered metal, wherein a surface treatment has been applied to a first portion 310 of the core 302 resulting in twin boundaries 306 primarily or solely within the first portion 310. Examples of surface treatment processes include but are not limited to shot-peening, laser shock peening, deep cold rolling, hammer peening, and low plasticity burnishing. A second portion 312 of the core 302 may be relatively unaffected by the surface treatment with fewer or no twin boundaries 306 in this example. Depending on the process parameters and the type of surface treatment used, the plastic deformation effects of surface treatment (that cause twinning) are limited to only a few hundred microns beneath the surface in this example. The layered metal 200 or 300 in FIGS. 2 and 3 may comprise a plurality of elements, wherein the presence of the plurality of elements may increase lattice distortion to suppress hydrogen ingress.

FIGS. 2 and 3 are just two, non-limiting examples of layered HIC-resistant materials. Generally, in any given layered HIC material, the core may be a lower entropy alloy than the skin. The structural metal may comprise a nonhomogeneous, orthotropic, layered metal alloy including a skin exposed to the hydrogen and a core beneath the skin. The skin may comprise a microstructure with sufficiently high entropy to suppress initiation of hydrogen induced cracking (HIC). The core may comprise a microstructure with sufficiently low entropy to suppress crack growth.

In one or more embodiments, more particularly, the core may comprise a face centered cubic crystalline structure. In one or more embodiments, the core may comprise nickel, chromium, and cobalt in equimolar proportions. In one or more embodiments, the core may comprise iron, aluminum and/or boron at a concentration lower than 0.5 wt %. In one or more embodiments, the core may comprise iron, aluminum and/or boron at a concentration between about 0.01 wt % to about 0.5 wt %. In one or more embodiments, the core may comprise a stacking fault energy of 25 mJ/m2 or lower, wherein the stacking fault energy of the core may be designed such that it generates a greater density of twin boundaries when subjected to plastic deformation. In one or more embodiments, the core may be produced by directed energy deposition and with a suitable heat treatment to restore chemical homogeneity.

In one or more embodiments, other lower entropy alloy compositions, solution strengthened, or precipitation hardened Ni-base superalloys may be used as the core. In one or more embodiments, the core may comprise nickel, cobalt, and vanadium in an approximate equimolar proportion. In one or more embodiments, the core may enhance the formation of twin boundaries. In one or more embodiments wherein the core is a solution strengthened Ni-base superalloy, the core may comprise the following elements at a greater weight percentage than 2 wt %: nickel, chromium, iron, molybdenum, niobium, and tantalum. In one or more embodiments wherein the core is a solution strengthened Ni-base superalloy, the core may comprise a minimum content of nickel at approximately 57 wt % and may comprise approximately 0 wt % of boron or aluminum. In embodiments wherein the core is a precipitation hardened Ni-base superalloy, the core may comprise the following elements at a greater weight percentage than 2 wt %: nickel, chromium, iron, molybdenum, niobium, and tantalum. In embodiments wherein the core is a precipitation hardened Ni-base superalloy, the core may comprise a minimum content of nickel at approximately 50 wt %, a maximum content of boron at 0.05 wt %, and a maximum content of aluminum at 1.5 wt %.

In one or more embodiments, the skin is a higher entropy alloy than the core. In embodiments, the skin may comprise a face centered cubic crystalline structure. In embodiments, the skin may comprise the following elements at a greater weight percentage than 5 wt %: nickel, aluminum, cobalt, chromium, and iron. In those embodiments, there may be a content of at least 6.6 wt % aluminum. In embodiments, the skin may comprise a content of boron between about 0.1 wt % and about 0.25 wt % such that the combination of boron and aluminum may induce lattice distortion. In embodiments, the skin may suppress the diffusion of hydrogen in the material. In embodiments, the skin may comprise a stacking fault energy of about 50 mJ/m2 or higher, wherein the stacking fault energy of the skin may be designed such that the formation of twin boundaries is prevented during processing. In embodiments, the skin may be formed as an outer layer by directed energy deposition on a plastically deformed and heat-treated core.

In one or more embodiments, the skin may have a body centered cubic crystalline structure or combination of body and face centered cubic crystalline structure. In one or more embodiments, the skin may comprise the following elements at a greater weight percentage than approximately 5 wt %: nickel, aluminum, chromium, iron, and cobalt, with the aluminum content being at least 11.1 wt %.

In one or more embodiments, the surfaces of the layered metal may comprise a lower density of twin boundaries than the bulk (for example, the interior) of the layered metal. Without limitations the twin boundaries may be measured by transmission electron microscopy or electron backscatter diffraction (EBSD). The lower density of twin boundaries at the surfaces may inhibit the initiation of hydrogen induced cracks. The bulk or interior of the layered metal may induce twinning by having a high density of twin boundaries. The increased density of twin boundaries in the bulk may inhibit the propagation of any hydrogen induced cracks.

The foregoing provides an overview of examples of HIC-resistant materials, including those with layered or otherwise varied composition and/or microstructure. The following discussion and figures will present diagnostic systems and methods comprising sensors that may be incorporated into any materials for use in a hydrogen service environment. The discussion is presented in the context of a layered material structure, by way of example. However, the sensor arrangements and diagnostic systems and methods may be used with any suitable structural materials for a hydrogen service environment wherein the effect of a hydrogen and other parameters may be observed.

Figure 4:
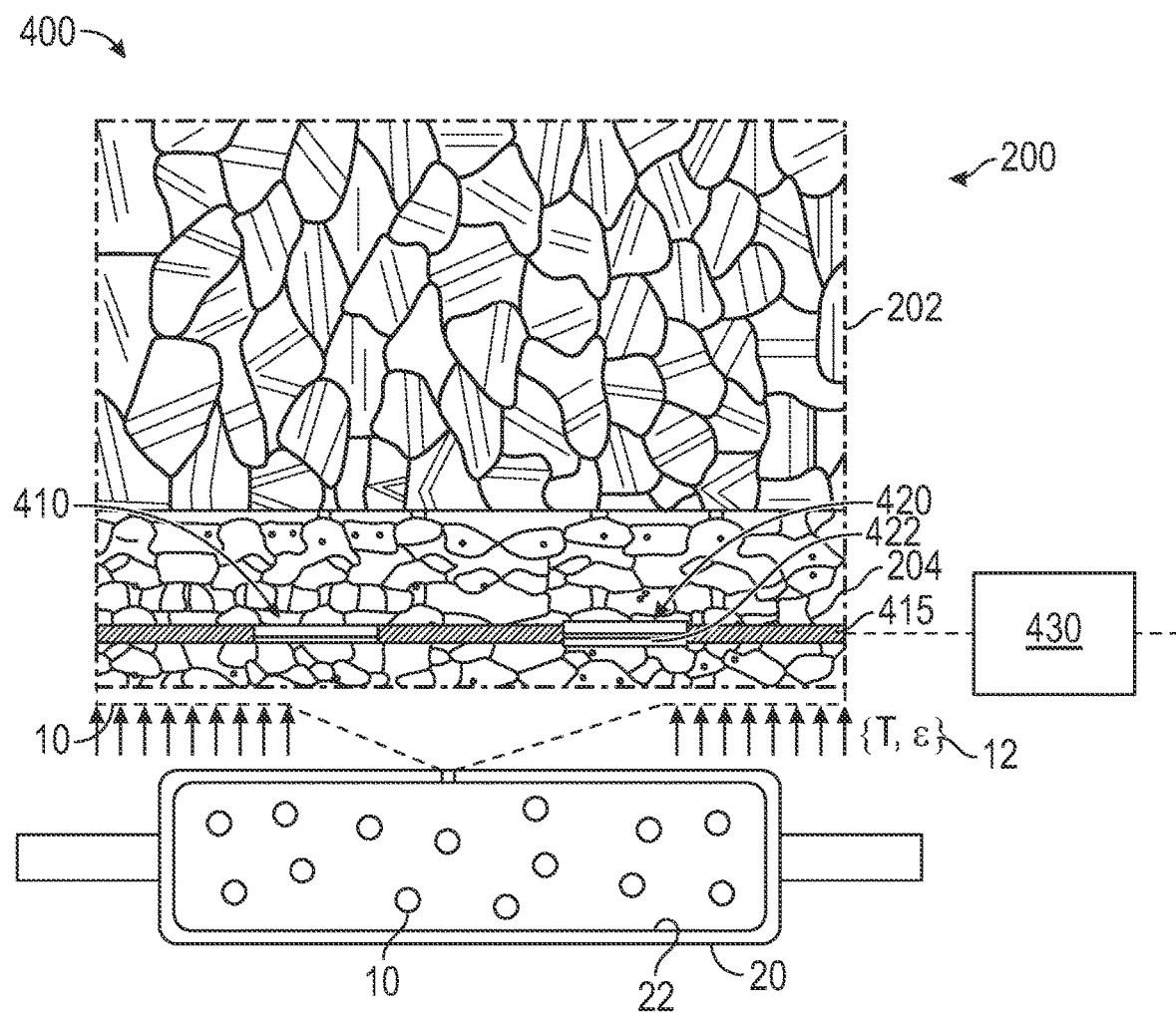
FIG. 4 is a schematic diagram of a diagnostic system with an enlarged, cross-sectional view of the HIC-resistant, layered structural metal of FIG. 2.

FIG. 4 is a schematic diagram of a diagnostic system 400 with an enlarged, cross-sectional view of the HIC-resistant, layered structural metal 200 of FIG. 2. In addition to suppressing hydrogen-induced cracks, the system 400 includes sensors responsive to hydrogen as well as changes in other parameters such as temperature changes and/or strains caused by hydrostatic pressure or other mechanical loads in the hydrogen service environment. The system 400 includes a hydrogen service component 20 formed of the layered structural metal 200. The hydrogen service component 20 is schematically depicted as comprising a housing in which the hydrogen 10 is enclosed, contained, or conveyed. The housing may represent, for example, a valve body, a chamber, a pressure vessel, a conduit, or other structure, as non-limiting examples. The housing may be open, such as to guide flow of a hydrogen-containing fluid or substance, or closed, such as to at least temporarily contain the hydrogen 10 in a sealed or unsealed capacity. Because the hydrogen 10 is inside the housing in this embodiment, the skin 204 is arranged on the internal portion and the skin 204 may define an interior wall 22 in contact with the hydrogen 10. The core 202 may have a high density of twins effective to suppress diffusion of the hydrogen.

The system 400 includes first and second sensors 410, 420 embedded within the structural metal 200, and more specifically within the skin 204 of the structural metal 200 in this example. The first and second sensors 410 may be fiber Bragg gratings (FBGs), alternately referred to as FBG-1 and FBG-2, embedded within the structural metal 200 in this example, although alternative sensors and coupling methods could be used. The skin 204 is exposed to the hydrogen 10, along with one or more parameters 12 of the hydrogen service environment including temperature (T) and strain (ε). The sensors 410, 420 may be positioned in sufficiently near proximity to experience the same or substantially similar hydrogen concentration and same value(s) of the one or more other parameters 12. The sensors 410, 420 may also be in communication, e.g., in optical communication via an optical fiber 415 with each other and/or with a controller 430.

The first sensor 410 is configured for generating a signal response to both the hydrogen 10 and one or more of the other parameters 12. The first sensor 410 may comprise an FBG, in which case the signal response may comprise an optical signal in the form of a wavelength shift in the optical fiber 415. Thus, a wavelength shift of the first sensor 410 may be partially attributable to the presence of hydrogen 10 and partially attributable to each of the other parameters 12.

The second sensor is configured for generating another signal response to the one or more parameter 12, which may also be in the form of a wavelength shift. However, a hydrogen-suppressing layer 422 is provided over the second sensor 420 to suppress any response of the second sensor to the hydrogen 10. Thus, the wavelength shift of the second sensor 420 may be partially attributable to each of the parameters 12 but not attributable (or measurably less attributable) to the hydrogen 10. In some configurations, the hydrogen-suppressing layer may comprise a MAX phase comprising a chemical composition $M_{n+1}AX_n$ (n=1, 2, or 3), where M is an early transition metal, A is an A group element, and X is C and/or N. In some configurations, the MAX phase may be coated with a ceramic material. In some configurations, the first and second sensors may further comprise an outer metallic protective layer to physically protect the sensors 410, 420 without the outer metallic protective layer necessarily suppressing hydrogen.

The controller 430 is in communication with the first and second sensors 410, 420 for receiving and interpreting their signal responses. In one aspect, because the first sensor 410 is responsive to hydrogen and the second sensor 420 is shielded from hydrogen, the controller 430 may distinguish the signal response of the first sensor 410 from the signal response of the second sensor 420 to characterize the hydrogen. Characterizing the hydrogen 10 may include determining the concentration of the hydrogen, or any other aspect of the hydrogen which has a measurable effect on the signal response of the first sensor 410 as compared with the second sensor 420. When the sensors as FBGs, the effect of hydrogen may be determined in some cases by taking the difference between a wavelength shift of the first sensor 410 and a corresponding wavelength shift of the second sensor 420.

Figure 5:
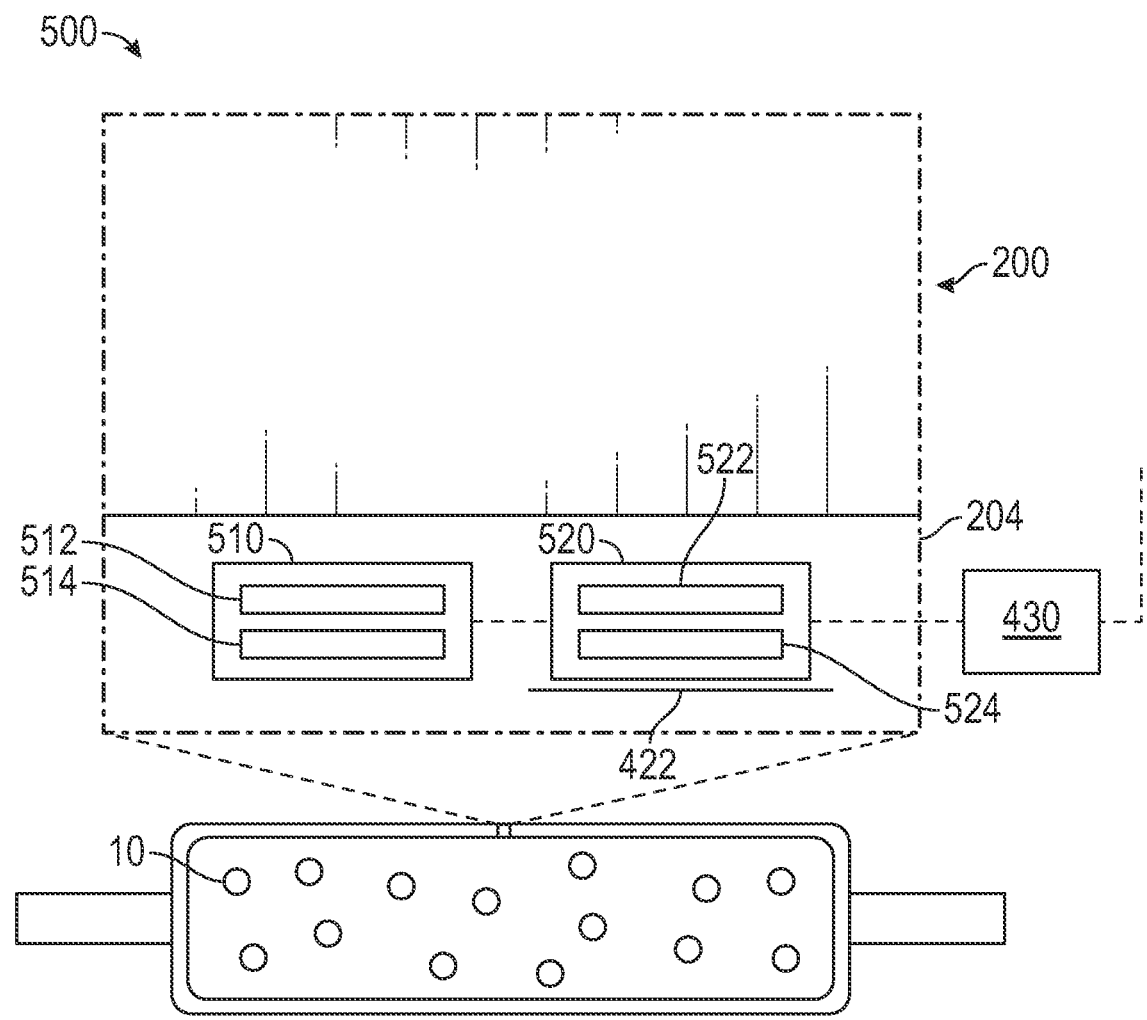
FIG. 5 is a schematic diagram of a diagnostic system with an alternate sensor configuration for individually distinguishing the effects of parameters such as temperature and strain, in addition to hydrogen.

FIG. 5 is a schematic diagram of a diagnostic system 500 with an alternate sensor configuration for individually distinguishing the effects of parameters such as temperature (T) and strain ($\varepsilon$), in addition to individually distinguishing hydrogen 10. A microstructure of the layered structural material is omitted in this figure for clarity but may comprise any HIC-resistant material within the scope of this disclosure. The layered structural material 200 has two sensors 510 and 520 embedded within the skin 204. The first sensor 510 comprises two sensor portions 512, 514 that each generate a signal response but with different sensitivities to the temperature and strain. The second sensor 520 also comprises two sensor portions 522, 524 that each generate a signal response but with different sensitivities to the temperature and strain. The controller 430 receives the signal responses from each of the sensor portions 512, 514, 522, 524 and includes control logic for distinguishing between the various signal responses to characterize the temperature and strain.

The first and second sensors 510, 520 may each comprise a fiber Bragg grating (FBG) exhibiting a wavelength shift as part of the respective signal response. The superimposed gratings may exhibit different wavelength shifts to the same temperature and strain. For example, the first sensor 510 may comprise an FBG wherein the two sensor portions 512, 514 comprise superimposed gratings. The first sensor portion 512 may have a first Bragg wavelength (e.g., 830 nm) with a particular strain sensitivity (e.g., 0.64 pm/με) and temperature sensitivity (e.g., 6.8 pm/C). The second sensor portion 514 may have a different Bragg wavelength (e.g., 1300 nm) with a different strain sensitivity (e.g., 1.00 pm/με) and temperature sensitivity (e.g., 10.0 pm/C). The signal responses may be compared and, on the basis of the different Bragg wavelengths and sensitivities to the other parameters, the controller 430 may be able to characterize, e.g., to quantify, the hydrogen 10 and the temperature and strain.

The hydrogen-suppressing layer 422 is optionally provided over the second sensor 520 to suppress any response of the second sensor to the hydrogen 10. Thus, the controller 430 may further compare the signal responses of the two sensors 510, 520 in order to factor out the contribution of the hydrogen, and thereby characterize (e.g., detect the concentration of) the hydrogen 10.

Figure 6:
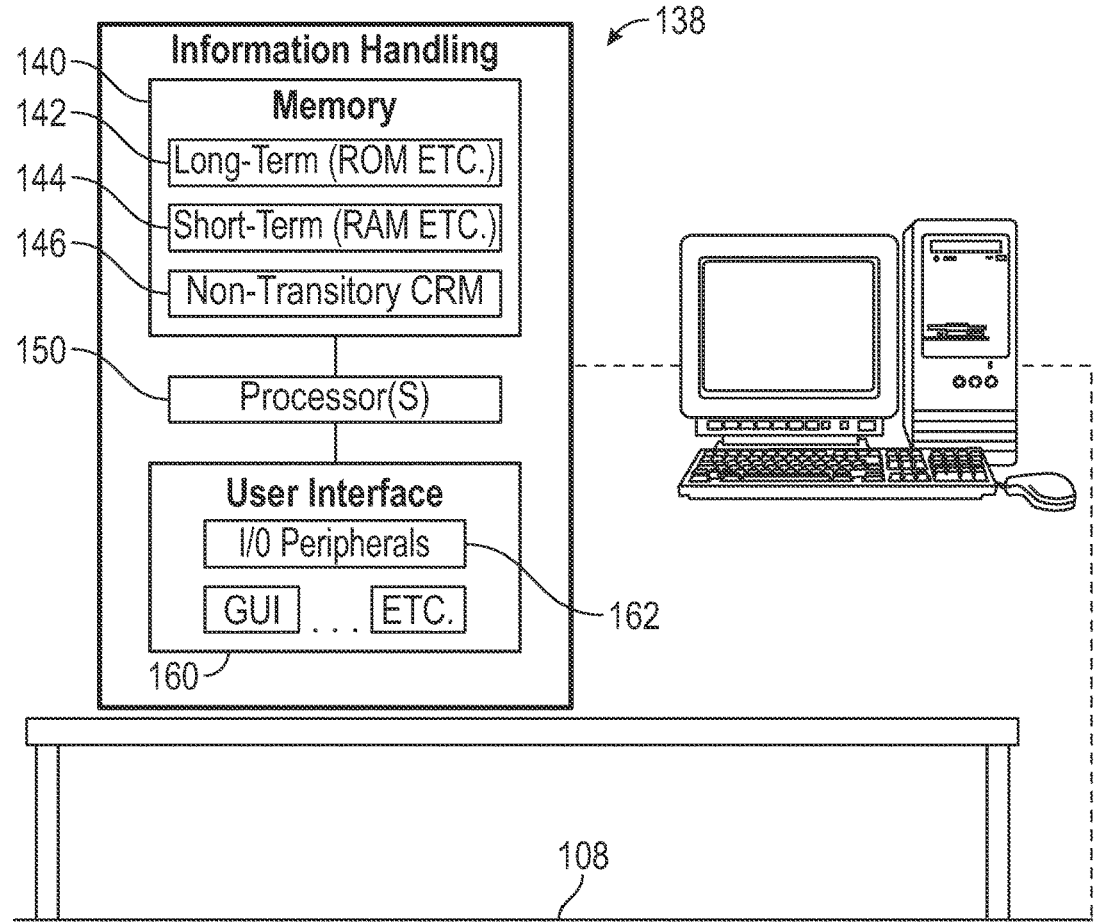
FIG. 6 is a system diagram further detailing aspects of an information handling system for use with a diagnostic system.
Figure 6:
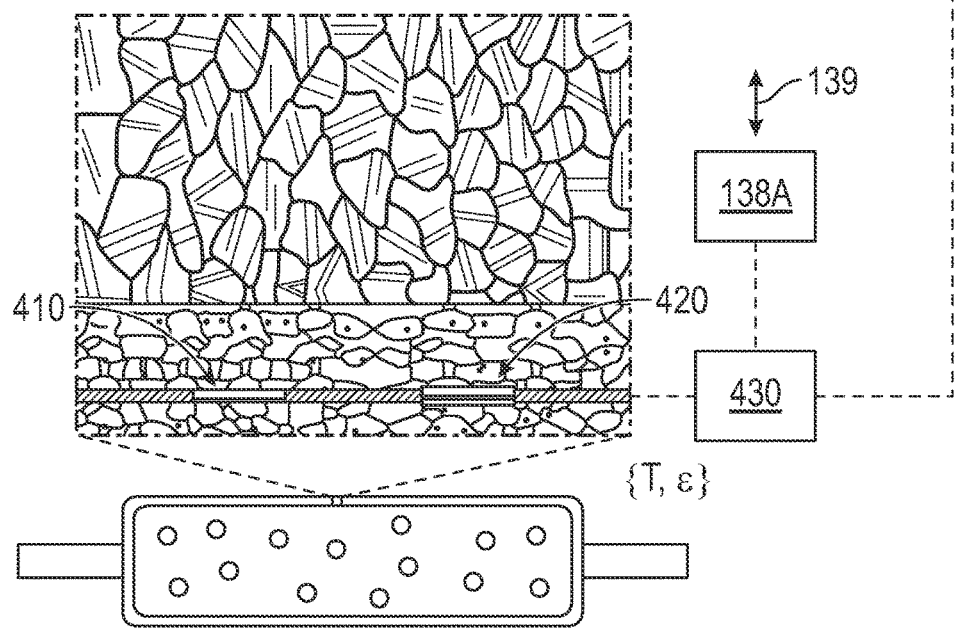

FIG. 6 is a system diagram further detailing aspects of an information handling system 138 for use with a diagnostic system, including but not limited to the diagnostic system 400 of FIG. 4. The information handling system 138 is in direct or indirect communication with the controller 430 and may be used to gather, store, process, communicate, and analyze the data from the sensors 410, 420 and other inputs and optionally to control components of the hydrogen service environment. In some examples, the hydrogen service environment may be downhole, such as below a surface 108 of the earth (e.g., ground level or sea bed) of a hydrocarbon recovery well site. Alternatively, the hydrogen service environment may be above ground, such as a laboratory or other hydrogen service environment. The information handling system 138 may include various spatially separated components, which may include various above-ground components (e.g. at a surface of the well site and/or a remote location) and/or below-ground components, such as a downhole information handling subsystem 138A. Such distributed or spatially separated components may be connected over a network or other suitable electronic communication medium. Thus, processing, storing, and/or analyzing of information may occur at different locations and times, and may occur partially downhole, partially at the surface 108 of the well site, and/or partially at a remote location, such as another well site or a remote data processing center. Sensor data and other information processed downhole may be transmitted to surface 108 to be recorded, observed, and/or further analyzed at the surface or remote site. Additionally, information recorded on information handling system 138 that may be disposed downhole may be stored until brought to surface 108. In some examples, the information handling system 138 may communicate with the controller 430 through a telemetry system (e.g., mud pulse, magnetic, acoustic, wired pipe, or combinations thereof) in real-time mode. The information handling system 138 may transmit information to the controller 430 or controller 430 and may receive as well as process information recorded by controller 430 or controller 430.

Generally, components of the information handling system 138 may include memory 140, one or more processor 150, and a user interface 160. Memory 140 may comprise any of a variety of electronic memory devices, such as one or more long-term storage device 142, one or more short-term storage device 144, and a non-transitory computer-readable medium (CRM) 146. Long-term memory may be structured, for example, as read only memory (ROM), which is a type of non-volatile memory for which data is not readily modified after the manufacture of the memory device. Short-term memory 144 may be structured, for example, as random access memory (RAM), which in contrast to ROM or Flash, can be read and changed. For example, short-term memory may be used to temporarily store information such as computer executable instruction code (e.g., from software) and/or data from sensors 410, 420 for processing by a processor 150. The non-transitory CRM 146 may comprise a device or structure on which computer executable instructions, data, and other information may be stored in a non-transitory manner. The user interface 160 generally comprises one or more devices electronically connected or connectable to other components of the information handling system 138 for communicating information from or to a user (typically, a human user). The user interface 160 may include input/output (I/O) peripherals 162. Examples of peripherals for user input include a keyboard, mouse, stylus, track pad, touchscreen, smart goggles or glasses, a microphone, and biometric (e.g. fingerprint, retina, or facial recognition) sensors. Examples of peripherals that provide output for a user include a video display, a speaker, a printer or other imaging device, a tactile feedback device, and smart goggles or glasses. Some of these peripherals provide both user input and user output.

The processor 150 may include a microprocessor or other suitable circuitry for processing information, such as for estimating, receiving and processing signals from the controller 430 or other BHA components. The controller 430 or information handling system may also include one or more additional components, such as analog-to-digital converter, filter and amplifier, among others, that may be used to process the measurements of the controller 430 before they may be transmitted to surface 108. Alternatively, raw measurements from controller 430 may be transmitted to surface 108.

Any suitable technique may be used for transmitting signals from controller 430 to surface 108, including, but not limited to available telemetry e.g., mud pulse, magnetic, acoustic, wired pipe, or combinations thereof). While not illustrated, controller 430 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 139, which may be a wired or wireless link. The telemetry data may be analyzed and processed by information handling system 138. A communication link 139 (which may be wired or wireless, for example) may be provided that may transmit data from the controller 430 or downhole information handling subsystem 138A to components of the information handling system 138 at surface 108.

The information handling system 138 described above thus represents any of a broad range of different configurations. The information handling system 138, in any of its configurations, may be used in performing all or part of the methods and controlling all or part of the systems further described herein for monitoring a hydrogen service environment and materials used therein. For example, the information handling system 138 may be used to process data from the sensors 410, 420 and other inputs to qualitatively or quantitatively characterize the presence of hydrogen, temperature, and strain, and their effects. The correlations may be used to guide decisions on HIC-resistant material design and improvement, or to generate real-time signals for monitoring and controlling equipment of the hydrogen service environment.

Any of a variety of methods are within the scope of this disclosure using aspects of the disclose HIC-resistant materials and diagnostic systems. In one example, generally, a method may comprise coupling first and second sensors to a layered metal alloy in a hydrogen service environment.

The layered metal alloy may comprise a skin exposed to hydrogen and having sufficiently high stacking fault energy to suppress initiation of hydrogen induced cracking. The layered metal alloy may also comprise a core with sufficiently low stacking fault energy to suppress crack growth. The method may include using the first sensor for generating a signal response to both the hydrogen and one or more parameter. The second sensor may also be used for generating another signal response to the one or more parameter while shielding the second sensor from the hydrogen. The hydrogen may then be characterized, such as by distinguishing the signal response of the first sensor from the signal response of the second sensor.

In one or more embodiments, the one or more parameters may comprise temperature and strain and the first and second sensors may each comprise a fiber Bragg grating (FBG) exhibiting a wavelength shift as part of the respective signal response to the temperature and strain. At least the first sensor may include two superimposed gratings that generate separate signal responses exhibiting different wavelength shifts to the same temperature and strain. The separate signal response from each sensor portion may be compared to characterize the temperature and strain.

The method may include a calibration method of calibrating the hydrogen sensor (FBG-1) to determine hydrogen concentration from the reduced wavelength shift. A method may include calibrating the first sensor by subjecting the first sensor to different hydrogen concentrations for a given temperature and pressure and recording a steady state wavelength shift of the first sensor as a function of hydrogen concentration. The step of characterizing the hydrogen may comprise comparing the wavelength shift of the first sensor in the presence of the hydrogen with the reduced wavelength shift of the second sensor being shielded from the hydrogen. For example, FBG-1 may be subjected to different hydrogen concentrations while keeping the temperature and pressure fixed. The steady state wavelength shift of FBG-1 may be recorded as a function of hydrogen concentration. Using an analysis technique such as a calibration plot, the reduced wavelength shift of FBG-1 obtained may be interpreted in terms of hydrogen concentration.

The method may also include manufacturing methods for the HIC-resistant materials, including the sensors used for the diagnostic system. In one embodiment, the method may comprise forming the skin on the core using directed energy deposition to deposit a high entropy alloy. One or more grooves may be formed in the skin using the directed energy deposition. One or both of the first and second sensors may be positioned in the one or more grooves. A remaining layer of the skin may then be deposited over the sensors to complete the skin. Additive manufacturing techniques such as selective laser melting, electron beam melting and ultrasonic additive manufacturing may be used to implant the sensor in the metal. In another embodiment, joining techniques, such as, laser brazing and TIG welding are used to implant the sensor in the metal.

The disclosed embodiments further include a method of designing a detection system with two sensors in series that are embedded in the high entropy alloy skin. Each sensor is optionally in the form of two superimposed Fiber Bragg Gratings (FBGs), such that it has two characteristic Bragg wavelengths. Each of these two Bragg wavelengths may show different sensitivities to strain and temperature. One of the sensors (e.g., FBG-2) may be coated with an inner thin layer, while the other sensor (e.g., FBG-1) does not have such a layer.

Optionally, this inner thin layer suppresses the diffusion of hydrogen into FBG-2. Optionally, this inner layer comprises of a MAX phase, such as $Ti_2AlN$, optionally coated with a ceramic material, such as $Al_2O_3$. MAX phases are a group of layered ternary metal carbides, nitrides, and carbonitrides, wherein the name MAX refers to the chemical composition: $M_{n+1}AX_n$ (n=1, 2, or 3), where M is an early transition metal, A is an A group element, and X is C and/or N. Optionally, each sensor further has an outer metallic layer, such as Ni, to protect it during its embedding in the high entropy alloy skin.

A preferred method of depositing these layers on the FBG is physical/chemical vapor deposition. Alternative manufacturing techniques also include the use of additive manufacturing to layer the hydrogen-resistant layer, ceramic layer, outer metallic layer, and other layers.

A method of embedding the sensor in the high entropy alloy skin may include forming a groove with dimensions suitable to hold the coated sensor, using directed energy deposition. After placing the coated sensor in the groove, remaining layers can be deposited to complete the making of a high entropy alloy skin that is resistant to hydrogen-induced cracking, combined with a specifically engineered sensing capability.

Although preferred sensor configurations are disclosed above, it should be recognized that alternative sensor configurations are also within the scope of this disclosure. Examples of other sensor configurations are provided in FIGS. 7-9.

Figure 7:
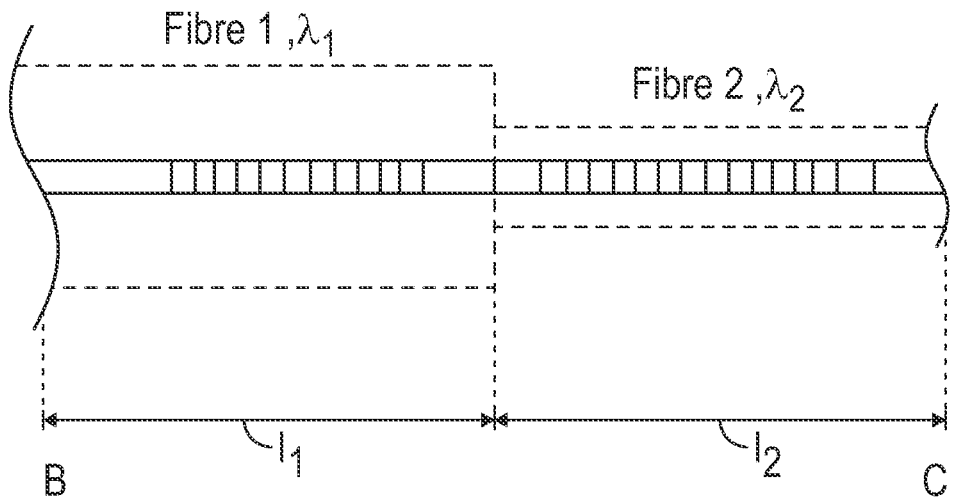
FIG. 7 is a schematic diagram of an alternative sensor configuration comprising two Bragg gratings with closely spaced center wavelengths, written on either side of a splice between two fibers of different diameter.

FIG. 7 is a schematic diagram of an alternative sensor configuration comprising two Bragg gratings with closely spaced center wavelengths. These may be written on either side of a splice between two fibers of different diameter, such that the gratings show similar temperature sensitivities but different strain responses to an applied stress.

Figure 8:
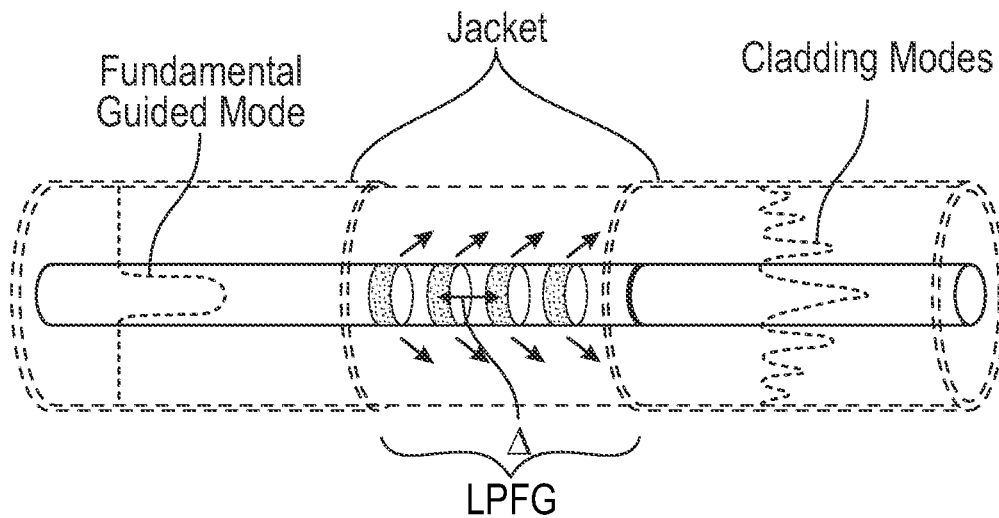
FIG. 8 is a schematic diagram of an alternative sensor configuration comprising a single long-period grating (LPG).

FIG. 8 is a schematic diagram of an alternative sensor configuration, wherein the sensor is a single long-period grating (LPG) and non-linearity and strain/temperature cross-sensitivity can be characterized using signal processing techniques given in previous literature.

Figure 9:
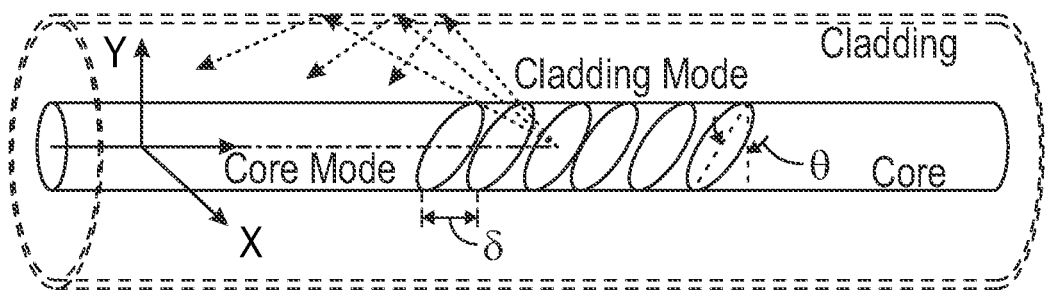
FIG. 9 is a schematic diagram of an alternative sensor configuration, wherein the sensor comprises a single tilted FBG.

FIG. 9 is a schematic diagram of an alternative sensor configuration, wherein the sensor is a single tilted FBG. Strain/temperature cross-sensitivity can be characterized by different dependencies of core mode and cladding mode wavelength shifts on these parameters.

Although numerous example are provided of embedding sensors in the HIC-resistant alloy, an alternative method may comprise external mounting of FBGs (e.g., in the wall of pipe) in a high entropy alloy skin. In another embodiment, a pair of FBG sensors is externally mounted on the skin. The FBGs may be encapsulated using an appropriate housing to protect the sensors from the downhole environment. The ends of the sensor housing can be processed into screw thread or fixed groove, to enable surface mounting via optional brackets with bolts, weld or grout.

Accordingly, the present disclosure provides diagnostic systems, methods, and materials for use in hydrogen service environments that may characterize hydrogen as well as one or more other parameters of the hydrogen service environment. The systems, methods, and materials may include any of the various features disclosed herein, including one or more of the following statements.

Statement 1. A diagnostic system, comprising: a first sensor embedded within a structural metal for exposure to hydrogen for generating a signal response to both the hydrogen and one or more parameter; a second sensor embedded within the structural metal for generating another signal response to the one or more parameter, with a hydrogen-suppressing layer to suppress any response of the second sensor to the hydrogen; and a controller in communication with the first and second sensors for distinguishing the signal response of the first sensor from the signal response of the second sensor to characterize the hydrogen.

Statement 2. The diagnostic system of Statement 1, further comprising: the one or more parameters comprises temperature and strain; the first sensor comprises two sensor portions that each generate a signal response but with different sensitivities to the temperature and strain; and the controller distinguishes between the signal response from each sensor portion of the first sensor to characterize the temperature and strain.

Statement 3. The diagnostic system of Statement 2, further comprising: the first and second sensors each comprise a fiber Bragg grating (FBG) exhibiting a wavelength shift as part of the respective signal response; and the two sensor portions of the first sensor comprise superimposed gratings that exhibit different wavelength shifts to the same temperature and strain.

Statement 4. The diagnostic system of any of Statements 1 to 3, wherein the structural metal comprises a nonhomogeneous, orthotropic, layered metal alloy including a skin for exposure to the hydrogen and a core beneath the skin, the skin comprising a microstructure with sufficiently high stacking fault energy to suppress initiation of hydrogen induced cracking (HIC) and the core comprising a microstructure with sufficiently low stacking fault energy to suppress growth of any hydrogen induced cracks.

Statement 5. The diagnostic system of Statement 4, wherein the first and second sensors are embedded in the skin of the layered metal alloy.

Statement 6. The diagnostic system of Statement 4 or 5, wherein the core has a high density of twins effective to suppress the growth of the hydrogen induced cracks.

Statement 7. The diagnostic system of any of Statements 1 to 6, wherein the hydrogen-suppressing layer comprises a MAX phase comprising a chemical composition $M_{n+1}AX_n$ (n=1, 2, or 3), where M is an early transition metal, A is an A group element, and X is C and/or N.

Statement 8. The diagnostic system of Statement 7, wherein the MAX phase is coated with a ceramic material.

Statement 9. The diagnostic system of any of Statements 1 to 8, wherein the first and second sensors each further comprise an outer metallic protective layer.

Statement 10. A hydrogen service component, comprising: a skin for exposure to hydrogen in a hydrogen service environment, the skin comprising a microstructure with sufficiently high stacking fault energy to suppress initiation of hydrogen induced cracking (HIC); a core beneath the skin, the core comprising a microstructure with sufficiently low stacking fault energy to suppress crack growth; a first sensor coupled to the skin for generating a signal response to both the hydrogen and one or more parameter; a second sensor coupled to the skin for generating a signal response to the one or more parameter and a hydrogen-suppressing layer to suppress any signal response of the second sensor to the hydrogen; and wherein the signal response of the first sensor is distinguishable from the signal response of the second sensor to characterize the hydrogen.

Statement 11. The hydrogen service component of Statement 10, wherein the one or more parameters comprises temperature and strain, the first sensor comprises two sensor portions that generate separate signal responses with different sensitivities to the temperature and strain, and a separate signal response is generated from each sensor portion to characterize the temperature and strain.

Statement 12. The hydrogen service component of Statement 11, wherein the first and second sensors each comprise a fiber Bragg grating (FBG) exhibiting a wavelength shift as part of the signal responses.

Statement 13. The hydrogen service component of Statement 12, wherein the two sensor portions of the first sensor comprise superimposed gratings comprising different Bragg wavelengths, each grating exhibiting a different wavelength shift to the same strain and temperature, whereby the different wavelength shifts are distinguishable to characterize the temperature and strain.

Statement 14. The hydrogen service component of any of Statements 10 to 13, wherein the structural metal comprises a nonhomogeneous, orthotropic, layered metal structure, wherein the skin and core are different layers.

Statement 15. The hydrogen service component of Statement 14, wherein the first and second sensors are embedded within the skin.

Statement 16. The hydrogen service component of any of Statements 10 to 15, wherein the core has a high density of twins effective to suppress diffusion of the hydrogen.

Statement 17. A method, comprising: coupling first and second sensors to a layered metal alloy in a hydrogen service environment, the layered metal alloy comprising a skin for exposure to hydrogen and having sufficiently high stacking fault energy to suppress initiation of hydrogen induced cracking (HIC), and a core with sufficiently low stacking fault energy to suppress crack growth; using the first sensor for generating a signal response to both the hydrogen and one or more parameter; using the second sensor for generating another signal response to the one or more parameter while shielding the second sensor from the hydrogen; and characterizing the hydrogen by distinguishing the signal response of the first sensor from the signal response of the second sensor.

Statement 18. The method of Statement 17, further comprising: the one or more parameters comprise temperature and strain and the first and second sensors each comprise a fiber Bragg grating (FBG) exhibiting a wavelength shift as part of the respective signal response to the temperature and strain, and at least the first sensor includes two superimposed gratings that generate separate signal responses exhibiting different wavelength shifts to the same temperature and strain; and comparing the separate signal response from each sensor portion to characterize the temperature and strain.

Statement 19. The method of Statement 18, further comprising: calibrating the first sensor by subjecting the first sensor to different hydrogen concentrations for a given temperature and pressure and recording a steady state wavelength shift of the first sensor as a function of hydrogen concentration; and wherein the step of characterizing the hydrogen comprises comparing the wavelength shift of the first sensor in the presence of the hydrogen with a reduced wavelength shift of the second sensor being shielded from the hydrogen.

Statement 20. The method of any of Statements 17 to 19, further comprising: forming the skin on the core using directed energy deposition to deposit a high entropy alloy; forming one or more grooves in the skin using the directed energy deposition; placing one or both of the first and second sensors in the one or more grooves; and depositing a remaining layer of the skin over the sensors to complete the skin.

To facilitate a better understanding of the present invention, the following examples of certain aspects of some embodiments are given. In no way should the following examples be read to limit, or define, the entire scope of the disclosure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A diagnostic system, comprising:
    a first sensor embedded within a structural metal for exposure to hydrogen for generating a signal response to both the hydrogen and one or more parameter;
    a second sensor embedded within the structural metal for generating another signal response to the one or more parameter, with a hydrogen-suppressing layer to suppress any response of the second sensor to the hydrogen; and
    a controller in communication with the first and second sensors for:
        distinguishing the signal response of the first sensor from the signal response of the second sensor to characterize the hydrogen,
        collecting a concentration of the characterized hydrogen a downhole equipment is exposed to over time;
        correlating the concentration of the characterized hydrogen the downhole equipment is exposed to over time with an observed degradation of the downhole equipment; and
        providing predictive capabilities of the downhole equipment being exposed to the characterized hydrogen over time.

2. The diagnostic system of claim 1, further comprising:
    the one or more parameter comprises temperature and strain;
    the first sensor comprises two sensor portions that each generate a signal response but with different sensitivities to the temperature and strain; and
    the controller distinguishes between the signal response from each sensor portion of the first sensor to characterize the temperature and strain.

3. The diagnostic system of claim 2, further comprising:
    the first and second sensors each comprise a fiber Bragg grating (FBG) exhibiting a wavelength shift as part of the respective signal response; and
    the two sensor portions of the first sensor comprise superimposed gratings that exhibit different wavelength shifts to the same temperature and strain.

4. The diagnostic system of claim 1, wherein the structural metal comprises a nonhomogeneous, orthotropic, layered metal alloy including a skin for exposure to the hydrogen and a core beneath the skin, the skin comprising a microstructure with sufficiently high stacking fault energy to suppress initiation of hydrogen induced cracking (HIC) and the core comprising a microstructure with sufficiently low stacking fault energy to suppress growth of any hydrogen induced cracks.

5. The diagnostic system of claim 4, wherein the first and second sensors are embedded in the skin of the layered metal alloy.

6. The diagnostic system of claim 4, wherein the core has density of twins effective to suppress the growth of the hydrogen induced cracks.

7. The diagnostic system of claim 1, wherein the hydrogen-suppressing layer comprises a MAX phase comprising a chemical composition $M_{n+1}AX_n$ (n=1, 2, or 3), where M is an early transition metal, A is an A group element, and X is C and/or N.

8. The diagnostic system of claim 7, wherein the MAX phase is coated with a ceramic material.

9. The diagnostic system of claim 1, wherein the first and second sensors each further comprise an outer metallic protective layer.

10. A hydrogen service component, comprising:
    a skin for exposure to hydrogen in a hydrogen service environment, the skin comprising a microstructure with sufficiently high stacking fault energy to suppress initiation of hydrogen induced cracking (HIC);
    a core beneath the skin, the core comprising a microstructure with sufficiently low stacking fault energy to suppress crack growth;
    a first sensor coupled to the skin for generating a signal response to both the hydrogen and one or more parameter;
    a second sensor coupled to the skin for generating a signal response to the one or more parameter and a hydrogen-suppressing layer to suppress any signal response of the second sensor to the hydrogen; and
    wherein the signal response of the first sensor is distinguishable from the signal response of the second sensor to characterize the hydrogen.

11. The hydrogen service component of claim 10, wherein the one or more parameter comprises temperature and strain, the first sensor comprises two sensor portions that generate separate signal responses with different sensitivities to the temperature and strain, and a separate signal response is generated from each sensor portion to characterize the temperature and strain.

12. The hydrogen service component of claim 11, wherein the first and second sensors each comprise a fiber Bragg grating (FBG) exhibiting a wavelength shift as part of the signal responses.

13. The hydrogen service component of claim 12, wherein the two sensor portions of the first sensor comprise superimposed gratings comprising different Bragg wavelengths, each grating exhibiting a different wavelength shift to the same strain and temperature, whereby the different wavelength shifts are distinguishable to characterize the temperature and strain.

14. The hydrogen service component of claim 10, wherein the structural metal comprises a nonhomogeneous, orthotropic, layered metal structure, wherein the skin and core are different layers.

15. The hydrogen service component of claim 14, wherein the first and second sensors are embedded within the skin.

16. The hydrogen service component of claim 10, wherein the core has a density of twins effective to suppress diffusion of the hydrogen.

17. A method, comprising:
coupling first and second sensors to a layered metal alloy in a hydrogen service environment, the layered metal alloy comprising a skin for exposure to hydrogen and having sufficiently high stacking fault energy to suppress initiation of hydrogen induced cracking (HIC), and a core with sufficiently low stacking fault energy to suppress crack growth;
using the first sensor for generating a signal response to both the hydrogen and one or more parameter;
using the second sensor for generating another signal response to the one or more parameter while shielding the second sensor from the hydrogen; and
characterizing the hydrogen by distinguishing the signal response of the first sensor from the signal response of the second sensor;
collecting a concentration of the characterized hydrogen a downhole equipment is exposed over time;
correlating the concentration of the characterized hydrogen the downhole equipment is exposed over time with an observed degradation of the downhole equipment; and
providing predictive capabilities of the downhole equipment being exposed to the characterized hydrogen over time.

18. The method of claim 17, further comprising:
the one or more parameters comprise temperature and strain and the first and second sensors each comprise a fiber Bragg grating (FBG) exhibiting a wavelength shift as part of the respective signal response to the temperature and strain, and at least the first sensor includes two superimposed gratings that generate separate signal responses exhibiting different wavelength shifts to the same temperature and strain; and
comparing the separate signal response from each sensor portion to characterize the temperature and strain.

19. The method of claim 18, further comprising:
calibrating the first sensor by subjecting the first sensor to different hydrogen concentrations for a given temperature and pressure and recording a steady state wavelength shift of the first sensor as a function of hydrogen concentration; and
wherein the step of characterizing the hydrogen comprises comparing the wavelength shift of the first sensor in the presence of the hydrogen with a reduced wavelength shift of the second sensor being shielded from the hydrogen.

20. The method of claim 17, further comprising:
forming the skin on the core using directed energy deposition to deposit a high entropy alloy;
forming one or more grooves in the skin using the directed energy deposition;
placing one or both of the first and second sensors in the one or more grooves; and
depositing a remaining layer of the skin over the sensors to complete the skin.

* * * * *